Aug. 22, 1961  R. D. KAUFFMAN ET AL  2,997,333
ALL-WEATHER CAB ENCLOSURE EMPLOYING REMOVABLE PANELS
Filed Jan. 5, 1959  3 Sheets-Sheet 1
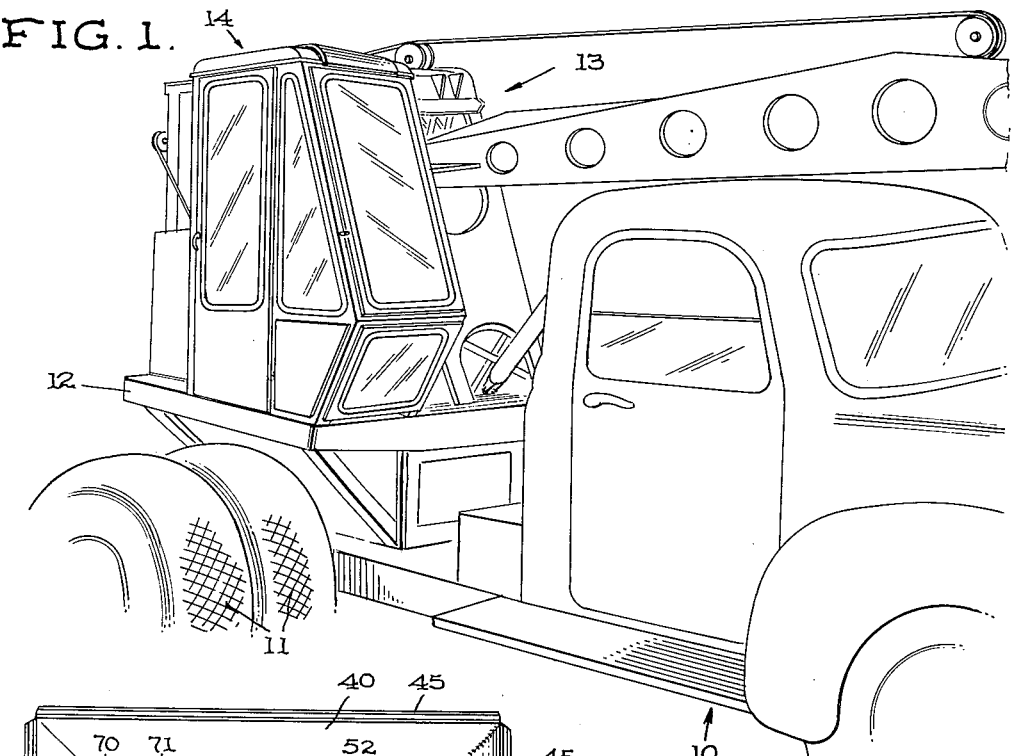
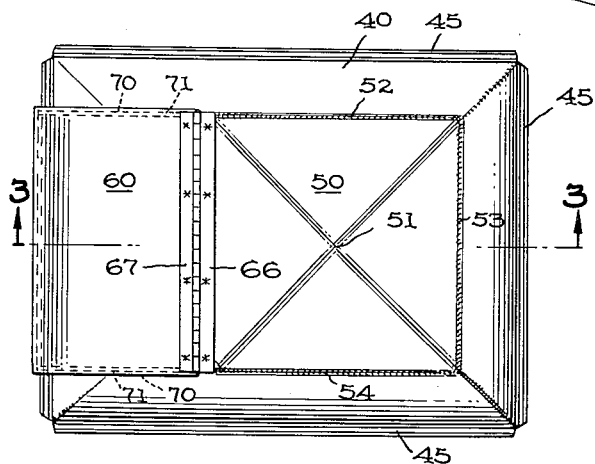
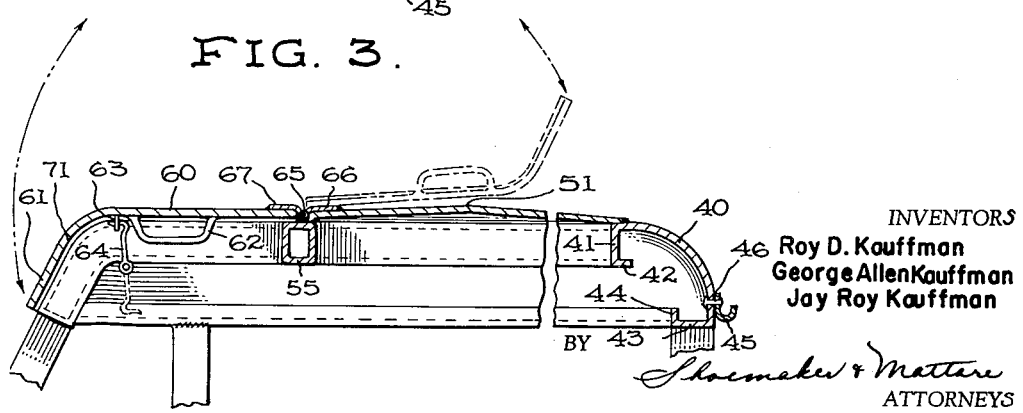
INVENTORS
Roy D. Kauffman
George Allen Kauffman
Jay Roy Kauffman
BY Shoemaker & Mattare
ATTORNEYS

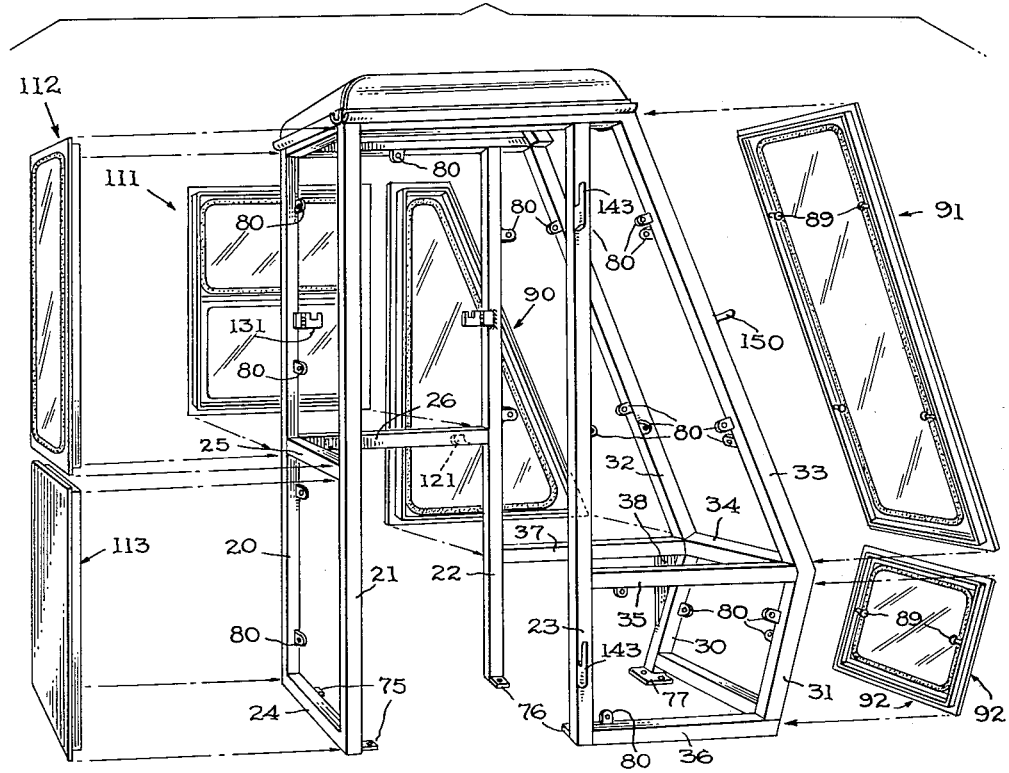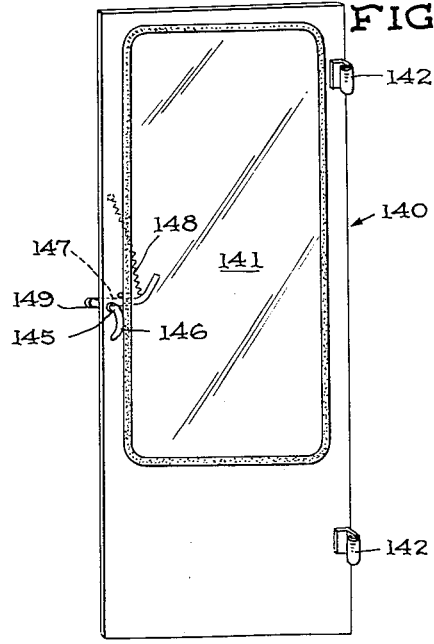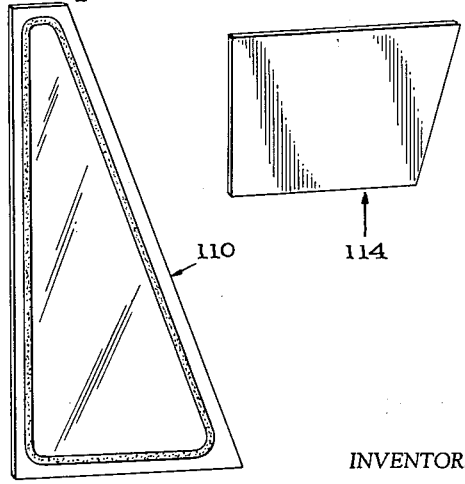

Aug. 22, 1961   R. D. KAUFFMAN ET AL   2,997,333
ALL-WEATHER CAB ENCLOSURE EMPLOYING REMOVABLE PANELS
Filed Jan. 5, 1959   3 Sheets-Sheet 3

INVENTORS
Roy D. Kauffman
George Allen Kauffman
Jay Roy Kauffman
BY Shoemaker & Mattare
ATTORNEYS

United States Patent Office 2,997,333
Patented Aug. 22, 1961

2,997,333
ALL-WEATHER CAB ENCLOSURE EMPLOYING REMOVABLE PANELS
Roy D. Kauffman, George Allen Kauffman, and Jay R. Kauffman, Silver Spring, Md., assignors to Crane Rental Company, Inc., Washington, D.C., a corporation of Delaware
Filed Jan. 5, 1959, Ser. No. 785,068
8 Claims. (Cl. 296—28)

The present invention relates to a new and novel cab enclosure for cranes or the like, and more particularly to a cab enclosure employing a rigid open framework upon which a plurality of completely removable panels may be mounted.

The present invention relates to cab enclosures which may be employed with various types of equipment and is particularly suited for use with cranes and the like wherein the operator is positioned adjacent the controls of the apparatus and is ordinarily provided with some sort of enclosure to protect him from the elements and also from the hazards of falling objects which may often occur in and about construction projects.

Cranes of the type with which the invention apparatus may be employed are ordinarily supported upon a rigid platform which, for example, may be mounted upon the bed of a truck such that it may be transported from place to place. The crane or similar apparatus is generally mounted upon such a platform, and the cab enclosure is situated closely adjacent to the crane apparatus in such a position that the operator can reach the various controls for operating the crane. Cranes are ordinarily provided with a conventional cab, but cab enclosures as employed in the prior art have proved to be disadvantageous for a number of reasons.

Conventional enclosures have proved unsatisfactory due to the fact that there is not adequate visibility such that the operator can see in all directions, and more particularly visibility in an upward direction is usually limited due to the necessity of providing a more or less rigid top for the enclosure in order to protect the operator from falling objects. In addition, conventional cabs are ordinarily designed such that the operator is in a sitting position, and it is very uncomfortable if the operator desires to stand up within the enclosure since he is forced to stoop over, and this, of course, is very tiring over an extended period of time.

Such cab enclosures must, of course, be as water proof as possible such that operators can operate the cranes or similar equipment during inclement and cold weather. A major disadvantage of prior art cab enclosures is the fact that in order to provide the desired protection for bad weather, the cabs are generally provided with fixed walls having perhaps one or two small windows which may be open during hot weather. Of course, the door of the apparatus may also be open, but it is evident that in hot weather the heat is compounded by the proximity of the crane equipment which in itself generates a certain amount of heat, and the ventilation afforded in conventional cabs is very inadequate.

It is not feasible to totally remove a cab enclosure during hot weather because of the fact that it may often rain or for various other reasons it may be desired to have an enclosed cab. Accordingly an important feature of the present invention is the provision of a plurality of completely removable panels mounted upon a suitable framework whereby all or some of the panels may be removed in accordance with the operator's desires and may also be quickly replaced should it be necessary due to particular weather conditions. In this manner, a very flexible and adaptable arrangement is provided such that the cab may be enclosed to any desired degree in accordance with the desires of the operator utilizing the enclosure.

According to the present invention, a rigid frame is composed of a plurality of rigid interconnected frame members which provide an open framework defining a plurality of open spaces. A substantially rigid top enclosure is provided for protecting the operator, and the forward portion of the top is hingedly mounted such that it can pivot toward the rear of the cab enclosure in order to permit the operator to see upwardly and greatly increase the visibility in an upward direction. The dimensions of the cab are so proportioned that the top of the cab is at least six feet in height, thereby permitting an average size operator to stand up within the cab as is often desirable during crane operations.

Each of the upper panels employed in the cab enclosure is provided with a major portion of glass or similar transparent material such that all around visibility is provided, thereby greatly facilitating operation of the crane. Each of the panels is formed of a substantially rigid outer frame composed of T-shaped members welded to one another. Each of these T-shaped members has a pair of laterally extending flanges, one of which has mounted on the inner surface thereof a suitable sealing material, such as rubber or the like, which is adapted to engage an adjacent frame member of the framework for providing an efficient water proof seal therewith.

The panels are also provided with laterally extending attaching studs which cooperate with attaching lugs secured to the frame members of the framework for rigidly securing the panels upon the framework. One of the panels also includes a fixed window portion and a movable window portion to facilitate access to certain of the controls which are disposed laterally of the cab enclosure. Pivotal latch means is provided for supporting the sliding window portion in raised position. A door means is hingedly connected to the framework and is provided with a pivoted handle connected to a latching means for securing the door in closed position. The exterior portion of the handle is also adapted to engage a door handle pin secured to the framework for maintaining the door in open position when desired.

An object of the present invention is to provide a new and novel cab enclosure which may be employed with various types of apparatus and is suitable for mounting in any desired position relative to the apparatus on a suitable supporting platform.

Another object of the present invention is the provision of a cab enclosure of adequate dimensions to permit an operator to stand upright therein.

A further object of the invention is to provide a cab enclosure having a rigid protective top including a pivoted portion for increasing visibility in an upward direction.

Yet another object of the invention is to provide a cab enclosure which provides substantially all around visibility and which is water proof to protect an operator during bad weather.

A still further object of the invention is to provide removable panels which may be quickly and easily mounted in position upon the frame or removed therefrom, the corresponding panels of various enclosures being completely interchangeable with one another.

Other objects and many attendant advantages of the invention will become more apparent when considered in connection with the accompanying specification and drawings wherein:

FIG. 1 is a perspective view of the cab enclosure according to the present invention mounted adjacent a crane supported on the bed of a truck;

FIG. 2 is a top plan view of the cab enclosure according to the present invention;

FIG. 3 is a slightly enlarged sectional view taken along line 3—3 of FIG. 2 looking in the direction of the arrows;

FIG. 4 is a perspective exploded view illustrating the framework and relationship of various panels mounted thereupon;

FIG. 5 illustrates the door of the cab enclosure;

FIG. 6 illustrates one of the panels employed in the cab enclosure;

FIG. 6a illustrates another panel employed in the cab enclosure;

Figure 7:
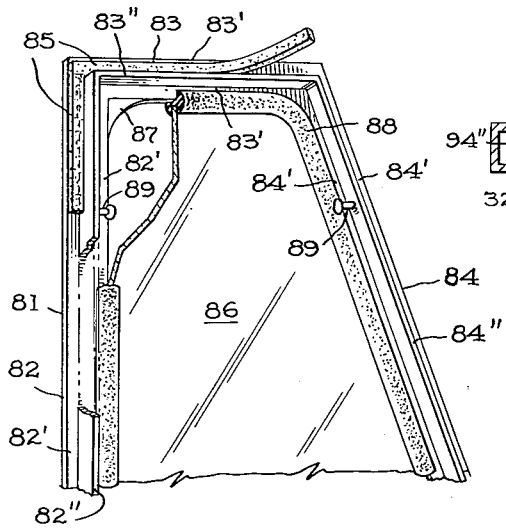
FIG. 7 illustrates a broken away perspective view of one of the panels of the device illustrating the constructional details thereof.

Referring now to the drawings wherein like reference characters designate corresponding parts throughout the several views, there is shown in FIG. 1 a truck indicated generally by reference numeral 10 having supporting wheels 11 and a platform 12 mounted upon the bed of the truck for supporting the crane apparatus indicated generally by reference numeral 13. The cab enclosure indicated generally by reference numeral 14 is mounted upon platform 12 closely adjacent to the crane apparatus, and it should be understood that the conventional controls for operating the crane are housed either within the cab enclosure or closely adjacent thereto such that an operator within the cab enclosure can control the crane operation.

Referring now more particularly to FIG. 4, four upstanding hollow tubular-like frame members 20, 21, 22 and 23 of steel construction or the like are provided, two transversely extending frame members 24 and 25 having the opposite ends thereof welded to upstanding members 20 and 21, and a transverse member 26 having the opposite ends thereof welded to upstanding members 20 and 22. Upstanding members 30 and 31 are welded to angularly extending upstanding members 32 and 33 and a transverse brace member 34 for defining the front portion of the cab enclosure, transverse members 35 and 36 having the opposite ends thereof welded to upstanding members 23 and 31, and transversely extending member 37 having the opposite ends thereof welded to upstanding members 22 and 30. A strengthening fillet 38 is welded between transversely extending member 37 and upstanding member 30 for rigidifying the structure.

Connected to the upper portions of upstanding members 20, 21, 22, 23, 32 and 33 is a substantially rigid top for the cab which, as seen in FIGS. 2 and 3, comprises a substantially U-shaped portion 40 as seen in plan view in FIG. 2 formed of a single piece of material which is cut, mitered and welded into its finished shape as shown in the drawings. This U-shaped portion 40 has a cross-sectional configuration as seen most clearly in FIG. 3, including a downwardly extending flange 41 having an inwardly extending lip 42 formed thereon, and at the lower edge of member 40, an inwardly extending flange 43 is provided with an upwardly extending lip 44. This construction provides a very simple and light, yet quite sturdy construction. Gutter members 45 are secured by means of rivets 46 around the outer periphery of member 40 for carrying off rain water and preventing it from dripping downwardly between the panels and the framework.

As seen most particularly in FIG. 2, the central cavity defined by U-shaped member 40 is partly covered by a sheet 50 of thin metallic material which is substantially square in plan view and which is bent such that it has an apex 51 sloping downwardly in four sections to the four lateral edges thereof for rigidifying sheet member 50. The three edges 52, 53 and 54 of sheet member 50 are welded to U-shaped member 40 for maintaining an operative position, the other edge of sheet member 50 being welded to a tubular cross brace member 55 which extends between and has the opposite ends thereof welded to flange portion 41 of U-shaped member 40.

As seen most particularly in FIG. 3, the top includes a movable portion 60 which comprises a sheet of material having a forwardly and downwardly extending portion 61 with a handle 62 secured integrally to the underside thereof as well as an eye member 63 adapted to be engaged by a hook member 64 pivotally connected to flange 41 of the U-shaped member. A hinge 65 has one plate 66 thereof welded to sheet 50 and the other plate 67 thereof welded to movable member 60 whereby member 60 is pivotally supported such that it may be pivoted into dotted line position shown in FIG. 3, thereby affording substantially increased visibility in an upward direction. It is apparent that movable member 60 may be locked in closed position by means of hook member 64. A sealing strip 70 extends along the opposite lateral edges of movable member 60 and cooperates with a similar sealing strip 71 mounted upon the upper surface of U-shaped member 40 closely adjacent the opening defined by the forward end portions of the two legs of the U-shaped member and cross member 55 for preventing the entrance of water within the cab between the upper surface of the U-shaped member 40 and movable member 60.

Referring again to FIG. 4 of the drawings, a pair of supporting attaching lugs 75 is secured to the lower inner surface of transverse member 24, similar attaching lugs 76 being attached to the lower inner surface of upstanding frame members 22 and 23. Another supporting and attaching plate 77 is secured to the lower surface of upstanding member 30, each of attaching and supporting legs 75, 76 and 77 being employed to rigidly secure the framework to the supporting platform.

A plurality of attaching lugs 80 are secured to the various frame members of the framework for securing the removable panels in place. Each of attaching lugs 80 extends laterally of the frame members adjacent the inner side thereof and is provided with a central opening formed therethrough through which a suitable attaching bolt extends. The attaching lugs are generally secured to the frame members at opposite sides of each opening defined within the framework for securing the panel members in spanning relationship over the various spaces. These spaces may be defined in general as an upper front space, a lower front space, a right forward upper space, a right forward lower space, a left forward upper space, a left side space, a rear upper space and a rear lower space. Each of these spaces is adapted to be filled by panels hereinafter described. The remaining spaces on the left hand side of the cab enclosure may also be provided with panels if desired, but with the particular crane structure disclosed, it is preferable to leave these spaces open in order to provide access to certain control components of the crane structure.

Referring now to FIG. 7, the manner of construction of the panels is more clearly illustrated. FIG. 7 discloses the left forward upper panel 81, the outer rigid frame of which comprises a plurality of substantially T-channel shaped members, three of which 82, 83 and 84 are shown in this figure. The end portions of these various channel members are mitered and welded to one another in order to provide a rigid frame. Each of the channel members includes a pair of opposite laterally extending flanges numbered 82', 83' and 84' respectively for the various members, and in addition each of the channel members is provided with a normally extending flange numbered 82", 83" and 84" respectively. Sealing strips 85 are provided completely around the panel in the form of rubber strips with a mastic backing provided with a sticky surface for securing the sealing strips to the flanges 82', 83' and 84'. It is, of course, apparent that the lower ends of channel members 82 and 84 are connected by a similar T-channel member about which the sealing strip also extends. The sealing strips 85 provide a water proof interconnection between the panel and the adjacent frame member since the sealing strips are normally disposed in tight frictional engagement with the adjacent frame members.

The left forward upper panel of the structure is provided with a sheet of glass 86 disposed in spanning relationship between the various channel members, each of the panels having glass mounted therein being provided with curved fillets 87 at the various corners thereof which are welded in place to provide rounded surfaces for mounting the glass by means of conventional rubber mounting gaskets 88 as are conventionally employed for securing glass within the frame such as in automobile windows or the like. A pair of similar headed attaching studs 89 is suitably secured as by welding to the lateral surface of flanges 82″ and 84″ of the panel and project laterally inwardly therefrom, only two of the studs illustrated in FIG. 7. These attaching studs are employed for securing the panel in operative position as more clearly hereinafter described.

Figure 8:
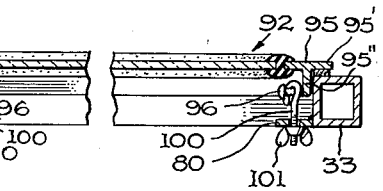
FIG. 8 is a sectional view illustrating the manner of attachment of the panels to the framework.

Referring again to FIG. 4, the left forward upper panel is illustrated generally by reference numeral 90 and it is apparent that it is adapted to fit within the left forward upper space of the framework and to be secured thereto in conjunction with attaching lugs 80 formed adjacent this space. The forward upper panel is illustrated generally by reference numeral 91 and the forward lower panel is illustrated generally by reference numeral 92. Referring now to FIG. 8, a sectional view taken through the forward upper panel 91 is shown illustrating the manner of attachment of the panel to the frame members 32 and 33. The forward upper panel includes side T-shaped members 94 and 95 having laterally extending flanges 94′ and 95′ and normally extending flanges 94″ and 95″ respectively. It is apparent that when in proper operative position, the sealing strips mounted upon flanges 94′ and 95′ will be in engagement with frame members 32 and 33 respectively to provide an effective fluid tight seal therewith.

Figure 9:
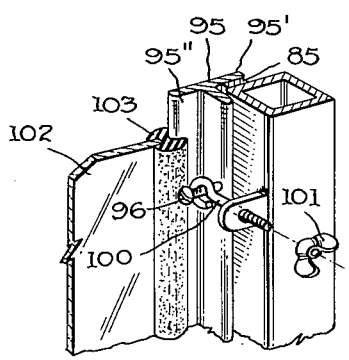
FIG. 9 is a broken away enlarged perspective view further illustrating the mode of attachment of the panels to the framework.

Extending substantially normally to flanges 94′ and 95′ are attaching studs 96 similar to the previously described attaching studs. Eye bolts 100 have the eye portion thereof disposed about the attaching studs 96 and the shank portion of the eye bolts extends through the central opening in the attaching lugs 80 and is provided with an outer threaded end portion. A wing nut 101 is threaded on the outer end of each of the eye bolts for locking the panel in place upon the framework. The aforementioned structure can be seen in even greater detail in FIG. 9 wherein the mode of assembly of the attaching means is more clearly illustrated. In this figure, it is seen that the glass portion 102 of the panel is secured to the laterally extending flange 95″ by means of rubber gasket 103 as previously described.

The mode of construction of each of the panels of the present invention is similar to the construction described specifically in connection with panels 90 and 92. It is evident that the forward right upper panel 110 as illustrated in FIG. 6 is substantially the same as panel 90 shown in FIG. 4, the only difference being that they are reversely constructed to fit on opposite sides of the framework. As mentioned previously, each of the panels having glass therein is provided with round fillets at the corners for supporting the glass, but various other of the panels are provided with a solid sheet of metallic material extending between the chanel members forming the frame thereof, and in such panels the need for the rounded fillets is eliminated.

It should be noted that the panels 90, 91, 92 and 110 are provided with glass therein as well as the left side panel 111 and the rear upper panel 112. The rear lower panel 113 and the right forward lower panel 114 are provided with solid sheets of spanning material, and of course are not transparent as are the other panels having glass therein. Each of the upper panels is accordingly provided with glass such that all around visibility is provided from the interior of the cab enclosure.

Figure 10:
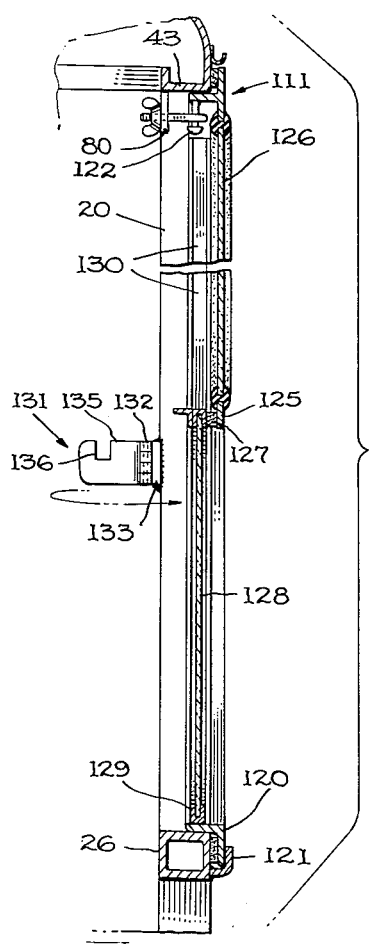
FIG. 10 is a sectional view of the panel employing a fixed window portion and a movable window portion.

Referring now to FIG. 10, the left side panel 111 is constructed in the manner similar to the remaining panels, the outer frame being constructed of T-shaped members except for the lower L-shaped member 120 formed at the bottom of the member. This L-shaped member is adapted to seat in a pair of brackets 121 secured as by welding to the outer surface of frame member 26 for maintaining the lower portion of the left side panel in position. Attaching stud 122 is secured to the upper frame member of the panel whereby the upper end of the panel is secured to the adjacent attaching lug 80 secured to the undersurface of flange 43 of the top of the cab. A transversely extending member 125 extends between the opposite side frame members of panel 111 and a piece of glass 126 is permanently fixed in the upper portion of the panel above the transverse member 125. A sealing strip 127 is provided on the inner surface of transverse member 125 and a second piece of glass 128 is mounted within a frame 129 which is slidably mounted within U-shaped channels 130 for guiding the lower portion of the window in its upward movement.

A pair of latching brackets 131, one of which is illustrated in FIG. 10, is hingedly connected as at 132 to a member 133 welded to the upstanding frame members 20 and 22. Latching brackets 131 include a pivotally supported outer end portion 135 having a slot 136 formed in the upper edge thereof such that when the bracket is pivoted outwardly in a position under the upper portion of panel 111, the lower portion of the frame of the movable window is adapted to seat within slot 136 for maintaining the movable window in upper raised position.

Referring now to FIG. 5, a door is indicated generally by reference number 140 having a large piece of glass 141 mounted in the central portion thereof and provided with a pair of hinge members 142 disposed at one side portion of the door. These hinge portions are adapted to receive the studs of the hinge supports 143 mounted upon upstanding frame member 23 whereby the door is hingedly mounted upon the frame and provides access to the interior thereof. A handle 145 is pivotally supported in the left portion of the door as seen in FIG. 5 and comprises a downwardly curved manual gripping portion 146 and an inwardly extending portion connected to a laterally extending arm 147. A tension spring 148 is connected between arm 147 and the frame of the door for normally urging arm 147 upwardly whereby the end portion 149 thereof is normally urged downwardly to seat behind frame member 21 of the enclosure for maintaining the door in closed position.

A door handle pin 150, as seen in FIG. 4, is mounted upon frame member 33 and projects forwardly thereof, pin 150 being mounted in such a position that when the door is pivoted to open position, portion 146 of the handle may be engaged about pin 150 for maintaining the door in open position.

It is apparent from the foregoing that there is provided a new and novel cab enclosure for cranes or the like which is adapted to be employed with various types of cranes and is suitable for mounting in different locations so as to provide access to the controls of the crane apparatus. The dimensions of the cab are such that they permit an operator to stand upright therein and provide all around visibility during operation. The top of the cab enclosure is quite rigid in order to afford protection for the operator, and a portion thereof is pivotally connected such that it may be pivoted rearwardly to provide better visibility in an upward direction. The various panels employed in the enclosure are completely removable and may be quickly and easily attached or removed in accordance with the existing weather conditions. It is apparent that in cold weather the cab may be completely enclosed, whereas in warm weather all the panels may be removed leaving only the open framework. Each of the panels is completely interchangeable with similar panels of corresponding cab enclosures, and the various panels provide a water proof seal with the framework such that the operator is adequately protected even in the most adverse weather. The structure according to the present invention is extremely simple, compact and inexpensive in construction, and yet is quite sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A cab enclosure for cranes or the like which comprises a plurality of upstanding rigid frame members and a plurality of transversely extending rigid frame members interconnected with said upstanding frame members to provide a rigid framework defining a front wall area and an opposed rear wall area and also defining a pair of opposed side wall areas, said side wall areas extending between adjacent edge portions of said front and rear wall areas, said areas including a plurality of open spaces, a substantially rigid top closure means for said cab enclosure, said top closure means including at the forward end thereof a movable portion hingedly connected thereto for pivotal movement toward the rear of the cab enclosure, said frame members having a plurality of laterally extending attaching lugs secured thereto, each of said lugs having an opening formed therethrough, a plurality of separately formed completely removable panels for filling the spaces defined in each of said front and rear wall areas as well as said side wall areas to fill substantially all the spaces defined by said framework, each of said panels including an outer rigid frame including a plurality of laterally extending attaching studs secured thereto for cooperation with the attaching lugs on said framework, eye bolts having the eye thereof engaged with said studs and including a shank portion extending through the opening in the attaching lugs, nut means engaged with said eye bolts for securing the panels in operative position, and a door pivotally supported upon said framework for providing access to the interior of the cab enclosure.

2. Apparatus as defined in claim 1 wherein said door includes a pivotally mounted handle means having connected thereto a latch mechanism, means normally urging said latch mechanism into locking position for maintaining the door in closed position, and means on said framework for engaging said handle for maintaining said door in open position.

3. Apparatus as defined in claim 1 wherein one of said panels includes an upper portion comprising a permanently fixed transparent window and includes a lower portion comprising a transparent window slidably supported upon the panel for movement upwardly adjacent said upper portion.

4. Apparatus as defined in claim 3 including at least one window support member pivotally supported by said framework adjacent said last mentioned panel and mounted for pivotal movement into position for supporting the movable lower portion of said last mentioned panel.

5. A cab enclosure for cranes or the like which comprises a plurality of interconnected rigid frame members defining an open framework of a height of at least six feet to permit an average size workman to stand upright therein, said frame members having laterally extending attaching lugs secured thereto, an opening formed through each of said attaching lugs, a pair of door hinge supports projecting outwardly from one of said frame members, a door handle pin extending outwardly from another of said frame members, a rigid top supported by said framework, means for preventing moisture from entering said cab enclosure from said top, said top including a hinged portion which pivots toward the back of the cab enclosure for providing better visibility in an upward direction, and a plurality of separately formed completely removable panels each of which includes a plurality of laterally extending attaching studs, eye bolts having the eye thereof engaged with said studs and including a shank portion extending through the openings in the attaching lugs, nut means engaged with said eye bolts for securing the panels in operative position, a door pivotally supported upon said door hinge supports, said door including an outwardly projecting handle adapted to engage said door handle pin for maintaining the door in open position.

6. Apparatus as defined in claim 5 wherein each of said panel members includes a laterally extending flange having a sealing means connected thereto for engaging an adjacent frame member for providing a water proof connection between said panel members and the cab enclosure.

7. Apparatus as defined in claim 5 wherein there are a plurality of upper panels disposed in spanning relationship to the uppermost spaces defined by the open framework, and there are a plurality of lower panels disposed in spanning relationship to the lowermost spaces defined by the framework, each of said upper panels having glass mounted therein for providing all around visibility, and some of said lower panels comprising metallic opaque material.

8. Apparatus as defined in claim 5 wherein one of said panels includes a fixed transparent upper portion and a slidable lower transparent portion, said lower portion being movable upwardly into position adjacent said upper portion, and means on said framework for maintaining said lower portion in upward position.

References Cited in the file of this patent

UNITED STATES PATENTS

| | | |
|---|---|---|
| D. 157,942 | Collin | Apr. 4, 1950 |
| 1,393,071 | Baxter | Oct. 11, 1921 |
| 1,856,773 | Masury | May 3, 1932 |
| 2,479,036 | Campbell | Aug. 16, 1949 |
| 2,529,200 | Swanson | Nov. 7, 1950 |
| 2,532,948 | Sanden | Dec. 5, 1950 |
| 2,557,339 | Campbell | June 19, 1951 |
| 2,596,903 | Kropp | May 13, 1952 |

FOREIGN PATENTS

| | | |
|---|---|---|
| 637,275 | Great Britain | May 17, 1950 |